United States Patent [19]

Pfeifer

[11] 4,258,177
[45] Mar. 24, 1981

[54] TRANSPARENT COPOLYAMIDE FROM 1,10-DISUBSTITUTED $C_{10}$ DIAMINE

[75] Inventor: Josef Pfeifer, Therwil, Switzerland

[73] Assignee: Ciba-Geigy Corporation, Ardsley, N.Y.

[21] Appl. No.: 83,144

[22] Filed: Oct. 9, 1979

[30] Foreign Application Priority Data

Oct. 18, 1978 [CH] Switzerland ........................ 10773/78

[51] Int. Cl.³ .............................................. C08G 69/26
[52] U.S. Cl. .................................... 528/338; 528/339; 528/340; 528/346; 528/347; 528/349
[58] Field of Search ............... 528/349, 338, 339, 340, 528/346, 347

[56] References Cited

U.S. PATENT DOCUMENTS 3,563,959  2/1971  Schade et al. ........................ 528/349

Primary Examiner—Harold D. Anderson
Attorney, Agent, or Firm—Luther A. R. Hall

[57] ABSTRACT

There are described transparent copolyamides which consist of recurring structural elements of the formula I

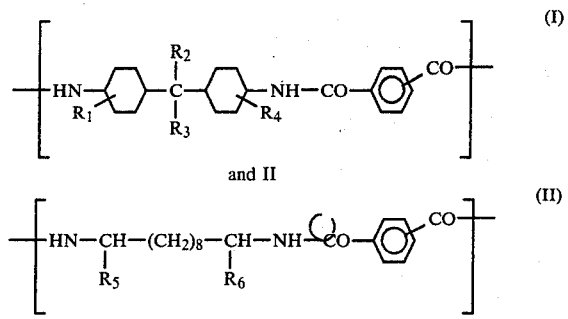

and II wherein $R_1$ to $R_4$ independently of one another are each hydrogen or alkyl having 1–4 C atoms, $R_5$ and $R_6$ independently of one another are each ethyl, n-propyl, isobutyl, —$CH(R_7)(R_8)$ or —$CH_2CH(R_9)(R_{10})$, $R_7$ is alkyl having 1–8 C atoms, $R_8$ is alkyl having 1–4 C atoms, $R_9$ is hydrogen or alkyl having 1–4 C atoms, and $R_{10}$ is alkyl having 2–8 C atoms, and wherein the proportion of structural elements (I) where $R_5/R_6 \neq$ —$CH_2CH(R_9)(R_{10})$ is 10–40 percent by weight, and where $R_5/R_6 =$ —$CH_2CH(R_9)(R_{10})$ it is 35–55 percent by weight, relative to the total weight of the polymer. The novel copolyamides are characterized by good thermoplastic processing characteristics, low water absorption, good stability to hydrolysis, and negligible dependence of the mechanical and electrical properties on the surrounding humidity, and are suitable for producing transparent moulded articles.

8 Claims, No Drawings

TRANSPARENT COPOLYAMIDE FROM 1,10-DISUBSTITUTED $C_{10}$ DIAMINE

The present invention relates to novel transparent copolyamides, to processes for producing them, and to the use thereof for the production of moulded articles.

Transparent copolyamides formed from 4,4'-diaminodicyclohexylmethane, hexamethylenediamine, isophthalic acid and terephthalic acid are described in the U.S. Pat. No. 3,597,400. These copolyamides absorb a great amount of water and their glass transition temperatures decrease considerably on immersion in water. The U.S. Pat. No. 2,696,482 describes transparent polyamides formed from 4,4'-diaminodicyclohexylmethane and isophthalic acid. These polyamides have a very high melt viscosity and a high absorption of water, and only with difficulty can they be condensed in the melt or processed from the melt. Finally, from the German Offenlegungsschrift No. 2,642,244 there are known transparent copolyamides formed from cycloaliphatic diamines, especially from 4,4'-diaminodicyclohexylmethane, isophthalic acid and aliphatic components, such as amino acids, aliphatic diamines and dicarboxylic acids, with these aliphatic components having to contain, relative to each amide group or to each pair of amide-forming groups, on average at least nine methylene groups, and the number of methylene groups between the amide-forming groups being at least six. If it is desired to produce with these systems copolyamides having high glass transition temperatures, the products obtained are brittle and exhibit a relatively high absorption of water.

There have now been found novel transparent copolyamides formed from aromatic dicarboxylic acids, 4,4'-diaminodicyclohexylalkanes and long-chain, branched alkylenediamines, which copolyamides are free from the disadvantages mentioned.

The novel copolyamides according to the invention have a reduced specific viscosity (in the following referred to also as reduced solution viscosity) of at least 0.5, preferably 0.7 to about 1.8, and particularly about 0.8 to about 1.3, dl/g, measured on a 0.5% solution in m-cresol at 25° C., and they consist of recurring structural elements of the formula I

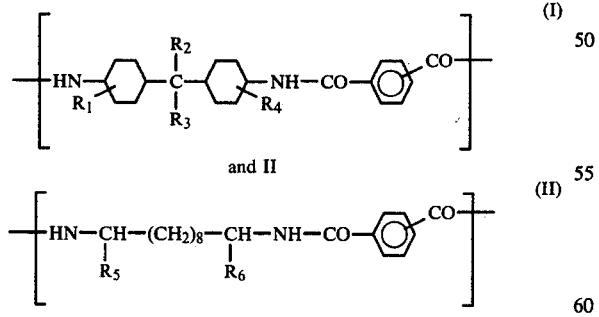

and II wherein the carbonyl groups are bound to the benzene nucleus in the 1,4-position in 50–85% of the sum of all structural elements of the formulae I and II, and in the 1,3-position in 50-15% of the sum of all structural elements of the formulae I and II, $R_1$ to $R_4$ independently of one another are each hydrogen or alkyl having 1–4 C atoms, $R_5$ and $R_6$ independently of one another are each ethyl, n-propyl, isobutyl, —$CH(R_7)(R_8)$ or —$CH_2CH(R_9)(R_{10})$, $R_7$ is alkyl having 1–8 C atoms, $R_8$ is alkyl having 1–4 C atoms, $R_9$ is hydrogen or alkyl having 1–4 C atoms, and $R_{10}$ is alkyl having 2–8 C atoms, and if $R_5$ and $R_6$ independently of one another are each ethyl, n-propyl, isobutyl or —$CH(R_7)(R_8)$ the proportion of structural elements of the formula I is 10–40 percent by weight, relative to the total weight of the polymer, and if $R_5$ and $R_6$ independently of one another are each a group —$CH_2CH(R_9)(R_{10})$ the proportion of structural elements of the formula I is 35–55 percent by weight, relative to the total weight of the polymer.

The copolyamides according to the invention are characterised by high glass transition temperatures and accordingly by high dimensional stability under heat, by good thermoplastic processing characteristics, by a low absorption of water combined with reduced dependence of the mechanical and electrical properties on the surrounding humidity, and by improved stability to hydrolysis. The novel copolyamides maintain even in a water-saturated condition high softening temperatures and are resistant to boiling water.

Alkyl groups denoted by $R_1$ to $R_4$ and $R_7$ to $R_{10}$ can be straight-chain or branched-chain, but are preferably straight-chain. Examples of alkyl groups of this type are: the methyl, ethyl, n-propyl, isopropyl, n- and sec-butyl, n-pentyl, n-hexyl, n-heptyl and n-octyl groups.

Alkyl groups $R_1$ to $R_4$ preferably contain 1 or 2 C atoms. Particularly preferably, $R_2$ and $R_3$ are each hydrogen, and $R_1$ and $R_4$ are each methyl.

Alkyl groups $R_7$ advantageously contain 1–5 C atoms, while alkyl groups $R_8$ are preferably those having 1–3 C atoms. Preferred meanings of $R_9$ are methyl and especially hydrogen. Alkyl groups $R_{10}$ advantageously contain 4–6 C atoms.

Preferred copolyamides according to definition are those wherein $R_1$ to $R_4$ independently of one another are each hydrogen or methyl, $R_5$ and $R_6$ are each ethyl, n-propyl, isobutyl or a group —$CH(R_7)(R_8)$, and $R_7$ and $R_8$ have the meanings given under the formulae I and II, the proportion of structural elements of the formula I is 15–32 percent by weight, relative to the total weight of the polymer, and the proportion of isophthalic acid components in the polymer, in mol.%, corresponds essentially to that of the diamine components of the formula

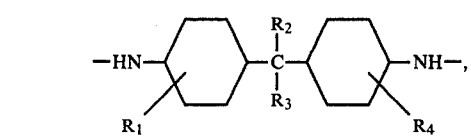

that is to say, of the cycloaliphatic diamine components. Particularly preferred copolyamides of the aforementioned type are those wherein $R_1$ and $R_4$ are each methyl, $R_2$ and $R_3$ are each hydrogen, $R_5$ and $R_6$ are each ethyl, n-propyl, isobutyl or a group —$CH(R_7)(R_8)$, $R_7$ is alkyl having 1–5 C atoms, and $R_8$ is alkyl having 1–3 C atoms, and the proportion of structural elements of the formula I is 20–30 percent by weight, relative to the total weight of the polymer. The proportion of isophthalic acid components, in mol.%, corresponds here essentially to that of the cycloaliphatic diamine components.

Furthermore, preferred copolyamides according to definition are those wherein $R_1$ to $R_4$ independently of one another are each hydrogen or methyl, and $R_5$ and $R_6$ are each a group $—CH_2CH(R_9)(R_{10})$, wherein $R_9$ and $R_{10}$ have the meanings given under the formulae I and II, the proportion of structural elements of the formula I is 38–52 percent by weight, relative to the total weight of the polymer, and the proportion of isophthalic acid components in the polymer, in mol.%, corresponds essentially to that of the cycloaliphatic diamine components; especially copolyamides of the aforementioned type wherein $R_1$ and $R_2$ are each methyl, $R_2$ and $R_3$ are each hydrogen, $R_9$ is hydrogen, and $R_{10}$ is alkyl having 4–6 C atoms, and the proportion of structural elements of the formula I is 40–50 percent by weight, relative to the total weight of the polymer. In this case, the proportion of isophthalic acid components in the polymer, in mol.%, corresponds essentially to that of the cycloaliphatic diamine components.

Particularly preferred are transparent copolyamides consisting of recurring structural elements of the formula Ia

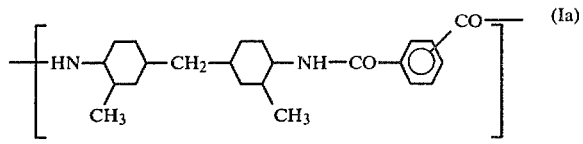

and IIa

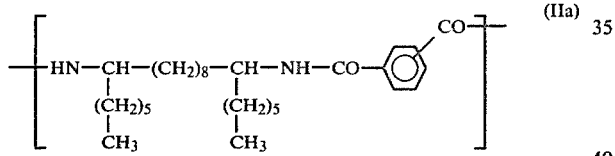

wherein the proportion of structural elements of the formula Ia is 45–50 percent by weight, relative to the total weight of the polymer, and the proportion of isophthalic acid components in the polymer, in mol.%, corresponds essentially to that of the cycloaliphatic diamine components.

Preferred copolyamides are also those consisting of recurring structural elements of the formulae Ia and IIb

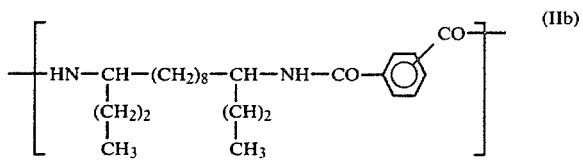

wherein the proportion of structural elements of the formula Ia is 25–30 percent by weight, relative to the total weight of the polymer, and the proportion of isophthalic acid components in the polymer, in mol.%, corresponds essentially to that of the cycloaliphatic diamine components.

The copolyamides according to the invention can be produced by reacting either (A) 10–40 percent by weight of a mixture of essentially stoichiometrical amounts of isophthalic acid or terephthalic acid, or of mixtures or amide-forming derivatives thereof, and a diamine of the formula III

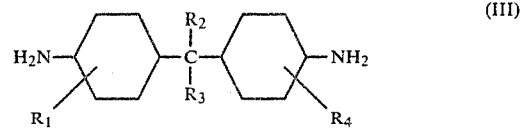

with 90–60 percent by weight of a mixture of essentially stoichiometrical amounts of isophthalic acid or terephthalic acid, or of mixtures or amide-forming derivatives thereof, and a diamine of the formula IVa

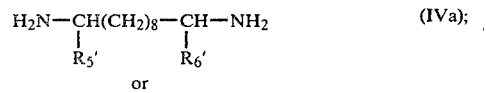

or (B) 35–55 percent by weight of a mixture of essentially stoichiometrical amounts of isophthalic acid or terephthalic acid, or of mixtures or amide-forming derivatives thereof, and a diamine of the formula III with 65–45 percent by weight of a mixture of essentially stoichiometrical amounts of isophthalic acid or terephthalic acid, or of mixtures or amide-forming derivatives thereof, and a diamine of the formula IVb

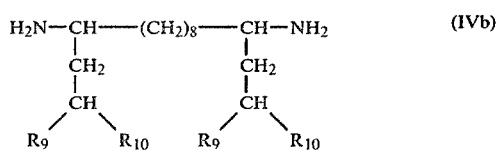

wherein $R_5'$ and $R_6'$ independently of one another are each ethyl, n-propyl, isobutyl or $—CH(R_7)(R_8)$, and $R_1$ to $R_4$ and $R_7$ to $R_{10}$ have the meanings given under the formulae I and II, and wherein the proportion of terephthalic acid, or of an amide-forming derivative thereof, with respect to the total amount of dicarboxylic acids is 50–85 percent by weight, and the proportion of isophthalic acid, or of an amide-forming derivative thereof, with respect to the total amount of dicarboxylic acids is 50–15 percent by weight, these weight percentages in the case of amide-forming derivatives of terephthalic acid or of isophthalic acid relating to identical functional groups.

As amide-forming derivatives of terephthalic acid or of isophthalic acid, it is possible to use for example the corresponding dihalides, particularly the dichlorides, dinitriles, dialkyl or diaryl esters, especially dialkyl esters having 1–4 C atoms in each of the alkyl moieties, and diphenyl esters The reaction of the reaction components according to definition can be performed by methods known per se. Production by the melt-polycondensation process in several stages is preferred. The diamines are in this case pre-condensed with essentially stoichiometrical amounts of dicarboxylic acids in a closed vessel, optionally with the addition of water, in an inert gas and at temperatures between about 240° and 290° C. The diamines and dicarboxylic acids are preferably used as salts; it is in particular advantageous to use the terephthalic acid in the form of the salt, since the free acid dissolves only slowly in the course of the pre-condensation process and results in extended reaction times. This difficulty does not arise with isophthalic acid, so that it can be used straight away as such, that is to say, without the formation of salt. Preferably, the diamines of the formula IVa or IVb and terephthalic acid are used as salts, whilst the diamine of the formula III and the isophthalic acid are used in the free form. The salts to be used for pre-condensation are produced from essentially stoichiometric amounts of terephthalic acid and diamine of the formula IVa or IVb in a suitable inert organic solvent. Suitable inert organic solvents are for example: cycloaliphatic alcohols, such as cyclopentanol and cyclohexanol, and especially aliphatic alcohols having up to 6 C atoms, such as methanol, ethanol, n-propanol, butanols, pentanols and hexanols, as well as mixtures of such solvents with water. The pre-condensate can be subsequently further condensed at temperatures between about 260° and 300° C. under normal pressure and in an inert-gas atmosphere until the copolyamides according to the invention are formed. It can be of advantage under certain circumstances to apply a vacuum after completion of polycondensation in order to degas the polyamide.

The copolyamides according to the invention can be produced also by melt- or solvent-polycondensation of diamines of the formula III, IVa or IVb with essentially stoichiometric amounts of an activated ester of iso- or terephthalic acid. Suitable activated esters are in particular the corresponding diphenyl esters. The reaction temperatures are in general between about 230° and 300° C.

The diamines of the formula III are known. The diamines of the formulae IVa and IVb are known, or they can be produced for example by catalytically hydrogenating 1,2-diaza-1,5,9-cyclododecatrienes or 1,2-diazacyclododecenes, appropriately substituted in the 3,12-position, in the presence of an inert organic solvent [see German Offenlegungsschrift No. 2,549,403].

The copolyamides according to the invention have a transparent appearance and high glass transition temperatures, but can nevertheless be very readily thermoplastically processed, for example by the injection moulding or extrusion process. They are distinguished also by low water absorption, good stability to hydrolysis, resistance to boiling water, and negligible impairment of the mechanical and electrical properties by the action of moisture.

The copolyamides according to the invention can be processed, by methods known per se, into transparent moulded articles of the widest variety, such as transparent apparatus and parts of apparatus.

EXAMPLES 1-16

(a) The diamines of the formula IVa or IVb which are used in these Examples can be obtained, using the process described in the German Offenlegungsschrift No. 2,549,403, by catalytic hydrogenation of 1,2-diaza-1,5,9-cyclododecatrienes or 1,2-diaza-cyclododecanes appropriately substituted in the 3,12-position:

1,10-diamino-1,10-diethyldecane by catalytic hydrogenation of 3,12-diethyl-1,2-diaza-1,5,9-cyclododecatriene; colourless oil [b.p. 83°-85° C./0.7 Pa; $n_D^{20}=1.4575$];

1,10-diamino-1,10-di-n-propyldecane by catalytic hydrogenation of 3,12-di-n-propyl-1,2-diaza-1,5,9-cyclododecatriene (diastereoisomeric mixture); colourless oil [b.p. 132°-135° C./1.3 Pa; $n_D^{20}=1.4590$; IR (liquid) inter alia bands at 3278 and 1613 cm$^{-1}$];

1,10-diamino-1,10-diisopropyldecane by catalytic hydrogenation of 3,12-diisopropyl-1,2-diaza-1,5,9-cyclododecatriene (diastereoisomeric mixture); colourless oil [b.p. 106°-109° C./1.3 Pa; $n_D^{20}=1.4600$; IR (liquid) inter alia bands at 3355, 3278, 1613 cm$^{-1}$];

1,10-diamino-1,10-diisobutyldecane by catalytic hydrogenation of 3,12-diisobutyl-1,2-diaza-1,5,9-cyclododecatriene (diastereoisomeric mixture); colourless oil [b.p. 168°-172° C./5 Pa; $n_D^{20}=1.4561$; IR (liquid) inter alia bands at 3289, 3205, 1600 cm$^{-1}$];

1,10-diamino-1,10-di-n-hexyldecane by catalytic hydrogenation of 3,12-dihexyl-1,2-diazacyclododecene (diasteroisomeric mixture); colourless oil [b.p. 184° C./2.6 to 0.7 Pa; $n_D^{20}=1.4624$; IR (liquid) inter alia bands at 3355, 3278, 1613 cm$^{-1}$];

1,10-diamino-1,10-di-(3-pentyl)-decane by catalytic hydrogenation of 3,12-di-(3-pentyl)-1,2-diazacyclododecene; colourless oil [b.p. 141°-143° C./0.5 Pa; $n_D^{20}=1.4666$; IR (liquid) inter alia bands at 3378, 3278, 1613 cm$^{-1}$];

1,10-diamino-1,10-di-(2-butyl)-decane by catalytic hydrogenation of 3,12-di-(2-butyl)-1,2-diaza-1,5,9-cyclododecatriene (diastereoisomeric mixture); colourless oil [b.p. 143°-145° C./7 Pa; $n_D^{20}=1.4639$; IR (liquid) inter alia bands at 3330, 1626 cm$^{-1}$];

1,10-diamino-1,10-di-(3-heptyl)-decane by catalytic hydrogenation of 3,12-di-(3-heptyl)-1,2-diazacyclododecene (diastereoisomeric mixture); colourless oil [b.p. 170° C./1.3 Pa; $n_D^{20}=1.4662$; IR (liquid) inter alia bands at 3278, 1613 cm$^{-1}$].

The 1,2-diaza-1,5,9-cyclododecatrienes and 1,2-diazacyclododecenes can be produced by the methods described in the German Offenlegungsschriften Nos. 2,330,087 and 2,549,403.

(b) Production of salts from terephthalic acid and various diamines of the formulae IVa and IVb In a round-bottomed flask provided with stirrer, reflux condenser and dropping funnel, 0.1 mol of terephthalic acid in 500 ml of an ethanol/water mixture (75 parts by volume of ethanol and 25 parts by volume of water) is heated to boiling. 0.1 mol of diamine is then introduced through the dropping funnel into the boiling suspension in the course of about 10 minutes, and the diamine residues in the dropping funnel are subsequently flushed with an amount of ethanol quantitatively into the flask. After 4 hours' stirring under reflux, the suspension is cooled to room temperature (20°-25° C.); the formed salt is then filtered off, and dried at 90° C. in a water-jet vacuum.

The salts from terephthalic acid and the following diamines are produced by the above method:

| Diamine | Yield (% of theory) | Designation |
|---|---|---|
| 1,10-diamino-1,10-diethyldecane | 97 | salt A |
| 1,10-diamino-1,10-di-n-propyldecane | 91 | salt B |
| 1,10-diamino-1,10-diisopropyldecane | 85 | salt C |
| 1,10-diamino-1,10-diisobutyldecane | 99 | salt D |
| 1,10-diamino-1,10-di-n-hexyldecane | 98 | salt E |
| 1,10-diamino-1,10-di-(3-pentyl)-decane | 96 | salt F |
| 1,10-diamino-1,10-di-(2-butyl)-decane | 97 | salt G. |

(c) The following components are weighed into a bomb tube fitted with a screw cover and with an incorporated high-pressure relief valve;

(a) 4,4'-diamino-3,3'-dimethyldicyclohexylmethane, (b) an amount of isophthalic acid equivalent to this diamine, (c) a salt from terephthalic acid and a diamine of the formula IVa or IVb, as described under (b).

After the air in the bomb tube has been completely expelled by nitrogen, the bomb tube is closed and is immersed in a salt bath, the temperature of which is 280° C. A homogeneous transparent melt has formed after 30–60 minutes. After a total of 3 hours, the precondensation is discontinued by removing the bomb tube from the salt bath and releasing the excess pressure by opening the valve. The solidified transparent precondensate is taken from the bomb tube and transferred to a condensation vessel. With the strict exclusion of air and the continuous passing through of nitrogen, the melt is polycondensed for 6 hours at a salt-bath temperature of 280° C., with the reaction water being continuously removed by the flow of nitrogen. On cooling, the melt solidifies to form a transparent mass.

In each case, 2–3 g of the produced polyamides is moulded, in a heatable hydraulic press at 280° C., into a sheet having a thickness of about 0.4 to 1 mm. In order to determine the water absorption, the sheets are exposed at room temperature to a relative humidity of 65% until equilibrium has been established, that is to say, until no further increase in weight can be ascertained. Depending on the thickness of sheet, the time necessary for this varies between about 10 and 60 days.

In Table I are given the composition and properties of the copolyamides obtained. With regard to the composition, there is given the proportion of salt formed from terephthalic acid and a diamine of the formula IVa or IVb in percent by weight, relative to the total weight of all components used. The difference with respect to 100 percent by weight is made up of an equimolar mixture of isophthalic acid and 4,4'-diamino-3,3'-dimethyldicyclohexylmethane.

The reduced viscosity $$\eta_{red.} = \frac{\eta_{rel.} - 1}{c}$$

is based on measurements on a 0.5% solution of the copolyamides in m-cresol at 25° C. The glass transition temperatures were measured in a differential calorimeter (DSC). In the case of the values for water absorption, these are the saturation values at room temperature.

The resistance of the transparency to boiling water is very good for all the copolyamides, that is to say, no impairment of the transparency can be detected even after several days.

TABLE I

| Example No. | Salt from TPA and diamine of the formula IVa/IVb | wt. % | η red. dl/g | Glass transition temperature °C. | Water absorption with 65% rel. humidity (wt. %) | Resistance to boiling water |
|---|---|---|---|---|---|---|
| 1 | salt E | 50 | 1.02 | 173 | 1.6 | very good |
| 2 | salt E | 52 | 0.86 | 169 | 1.5 | very good |
| 3 | salt E | 55 | 0.83 | 165 | 1.4 | very good |
| 4 | salt E | 60 | 0.96 | 160 | 1.2 | very good |
| 5 | salt A | 75 | 1.07 | 166 | 1.5 | very good |
| 6 | salt B | 70 | 0.85 | 163 | 1.4 | very good |
| 7 | salt B | 80 | 0.98 | 158 | 1.2 | very good |
| 8 | salt B | 85 | 0.93 | 151 | 1.1 | very good |
| 9 | salt D | 80 | 1.05 | 163 | 1.2 | very good |
| 10 | salt D | 74 | 0.83 | 167 | 1.4 | very good |
| 11 | salt C | 80 | 0.91 | 164 | 1.3 | very good |
| 12 | salt C | 70 | 1.01 | 178 | 1.6 | very good |
| 13 | salt F | 80 | 0.80 | 163 | 1.2 | very good |
| 14 | salt F | 75 | 0.98 | 170 | 1.4 | very good |
| 15 | salt G | 75 | 0.94 | 166 | 1.4 | very good |
| 16 | salt G | 78 | 0.82 | 161 | 1.3 | very good |

TPA = terephthalic acid

EXAMPLE 17

0.854 g of 4,4'-diamino-3,3'-dimethyldicyclohexylmethane, 2.213 g of 1,10-diamino-1,10-di-(2-butyl)-decane, 1.982 g of terephthalic acid diphenyl ester and 1.624 g of isophthalic acid diphenyl ester are weighed into a polycondensation vessel. Converted to salt units, as used in Table I, this corresponds to a proportion of 71 percent by weight of salt G, with 20 percent of terephthalic acid being replaced by isophthalic acid in this salt. The reaction mixture under nitrogen is immersed in a salt bath heated to 220° C. After a homogeneous melt has been formed, the temperature is raised every 30 minutes by 10° C. until 280° C. is reached. The major amount of the phenol which has been split off is distilled off during this time. In order to remove the last phenol residues, a water-jet vacuum is applied for one further hour at 280° C. On cooling, the melt solidifies to form a colourless mass. The reduced viscosity, measured on a 0.5% solution in m-cresol at 25° C., is 0.92 dl/g. The glass transition temperature is 167° C. A sheet about 1 mm thick absorbs at room temperature with 65% relative humidity 1.6 percent by weight of water. The resistance of the transparency to boiling water is very good.

EXAMPLE 18

In a manner analogous to that described in Example 17, there is produced a copolyamide from 4,4'-diamino-3,3'-dimethyldicyclohexylmethane and an equivalent amount of isophthalic acid diphenyl ester as well as 1,10-diamino-1,10-di-(3-heptyl)-decane and an equivalent amount of terephthalic acid diphenyl ester. The ratio of the reaction components is so arranged that, on conversion to salt units, the proportion of salt from terephthalic acid diphenyl ester and 1,10-diamino-1,10-di-(3-heptyl)-decane is 75 percent by weight. The reduced viscosity of the copolyamide obtained, measured on a 0.5% solution in m-cresol at 25° C., is 1.08; the glass transition temperature is 167° C.; the water absorption with 65% relative humidity is 1.2 percent by weight; and the resistance of the transparency to boiling water is very good.

The diamines of the formula IVa or IVb which are used in the above Examples can be produced, using the process described in the German Offenlegungsschrift No. 2,549,403, by catalytic hydrogenation of 1,2-diaza-1,5,9-cyclododecatriens or 1,2-diaza-cyclododecanes appropriately substituted in the 3,12-position.

EXAMPLE 19

The following substances are weighed into a bomb tube:
(a) 2.0104 g of 2,2-bis-(4-aminocyclohexyl)-propane,
(b) 1.3994 g of isophthalic acid,
(c) 3.4918 g of 1,10-diamino-1,10-di-n-hexyldecane, and
(d) 1.6961 g of terephthalic acid.

The mixture is sealed under nitrogen into a bomb tube and heated at 300° C. for 3 hours. After cooling, the solidified transparent substance is transferred to a condensation tube, and condensed for 5 hours in a flow of nitrogen. The reduced solution viscosity, measured on a 0.5% solution in m-cresol, is 0.71. The polyamide has a glass transition temperature of 159° C.; and with 65% relative humidity it absorbs a maximum of 1.1 percent by weight of water.

What is claimed is:

1. A transparent copolyamide which has a reduced specific viscosity of at least 0.5 dl/g, measured on a 0.5% solution in m-cresol at 25° C., and which consists of recurring structural elements of the formula I

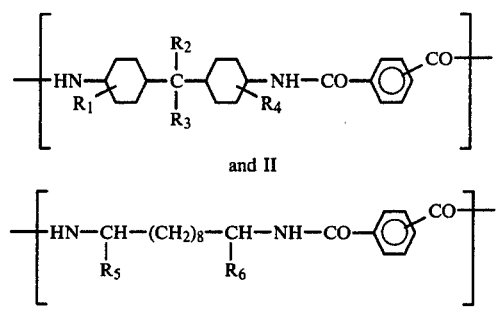

and II wherein the carbonyl groups are bound to the benzene nucleus in the 1,4-position in 50–85% of the sum of all structural elements of the formulae I and II, and in the 1,3-position in 50–15% of the sum of all structural elements of the formulae I and II, $R_1$ to $R_4$ independently of one another are each hydrogen or alkyl having 1–4 C atoms, $R_5$ and $R_6$ independently of one another are each ethyl, n-propyl, isobutyl, —CH($R_7$)($R_8$) or —CH$_2$CH($R_9$)($R_{10}$), $R_7$ is alkyl having 1–8 C atoms, $R_8$ is alkyl having 1–4 C atoms, $R_9$ is hydrogen or alkyl having 1–4 C atoms, and $R_{10}$ is alkyl having 2–8 C atoms, and if $R_5$ and $R_6$ independently of one another are each ethyl, n-propyl, isobutyl or —CH($R_7$)($R_8$) the proportion of structural elements of the formula I is 10–40 percent by weight, relative to the total weight of the polymer, and if $R_5$ and $R_6$ independently of one another are each a group —CH$_2$CH($R_9$)($R_{10}$) the proportion of structural elements of the formula I is 35–55 percent by weight, relative to the total weight of the polymer.

2. A transparent copolyamide according to claim 1, wherein $R_1$ to $R_4$ independently of one another are each hydrogen or methyl, and $R_5$ and $R_6$ are each ethyl, n-propyl, isobutyl or a group —CH($R_7$)($R_8$), and $R_7$ and $R_8$ have the meanings given under the formulae I and II, and wherein the proportion of structural elements of the formula I is 15–32 percent by weight, relative to the total weight of the polymer, and the proportion of isophthalic acid components in the polymer, in mol.%, corresponds essentially to that of the cycloaliphatic diamine components.

3. A transparent copolyamide according to claim 1, wherein $R_1$ to $R_4$ independently of one another are each hydrogen or methyl, and $R_5$ and $R_6$ are each a group —CH$_2$CH($R_9$)($R_{10}$), and $R_9$ and $R_{10}$ have the meanings given under the formulae I and II, and wherein the proportion of structural elements of the formula I is 38–52 percent by weight, relative to the total weight of the polymer, and the proportion of isophthalic acid components in the polymer, in mol.%, corresponds essentially to that of the cycloaliphatic diamine components.

4. A transparent copolyamide according to claim 2, wherein $R_1$ and $R_4$ are each methyl, $R_2$ and $R_3$ are each hydrogen, $R_7$ is alkyl having 1–5 C atoms, and $R_8$ is alkyl having 1–3 C atoms, and wherein the proportion of structural elements of the formula I is 20–30 percent by weight, relative to the total weight of the polymer, and the proportion of isophthalic acid components in the polymer, in mol.%, corresponds essentially to that of the cycloaliphatic diamine components.

5. A transparent copolyamide according to claim 3, wherein $R_1$ and $R_4$ are each methyl, $R_2$ and $R_3$ are each hydrogen, $R_9$ is hydrogen, and $R_{10}$ is alkyl having 4–6 C atoms, and wherein the proportion of structural elements of the formula I is 40–50 percent by weight, relative to the total weight of the polymer, and the proportion of isophthalic acid components in the polymer, in mol.%, corresponds essentially to that of the cycloaliphatic diamine components.

6. A transparent copolyamide according to claim 1, which consists of recurring structural elements of the formula Ia

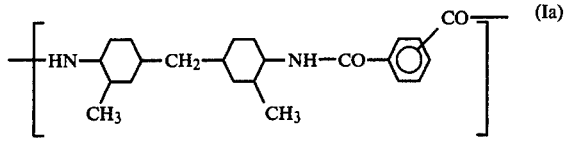

and IIa

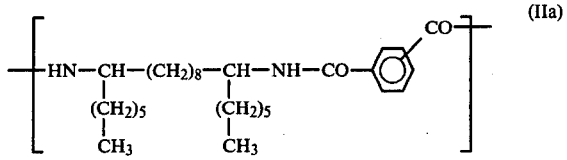

wherein the proportion of structural elements of the formula Ia is 45–50 percent by weight, relative to the total weight of the polymer, and the proportion of isophthalic acid components in the polymer, in mol.%, corresponds essentially to that of the cycloaliphatic diamine components.

7. A transparent copolyamide according to claim 1, which consists of recurring structural elements of the formula Ia

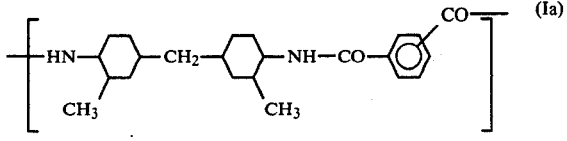

-continued
and IIb
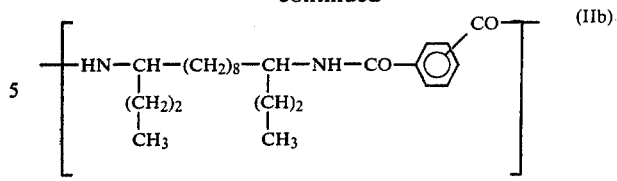
wherein the proportion of structural elements of the formula Ia is 25-30 percent by weight, relative to the total weight of the polymer, and the proportion of isophthalic acid components in the polymer, in mol.%, corresponds essentially to that of the cycloaliphatic diamine components.
8. A molded article of the copolyamide according to claim 1.